Aug. 24, 1926.  1,597,117
J. STETTER
LEATHER SPLITTING MACHINE
Filed Nov. 14, 1923   2 Sheets-Sheet 1

INVENTOR.
John Stetter
BY
Quarles & French
ATTORNEYS

Aug. 24, 1926.
J. STETTER
1,597,117
LEATHER SPLITTING MACHINE
Filed Nov. 14, 1923    2 Sheets-Sheet 2
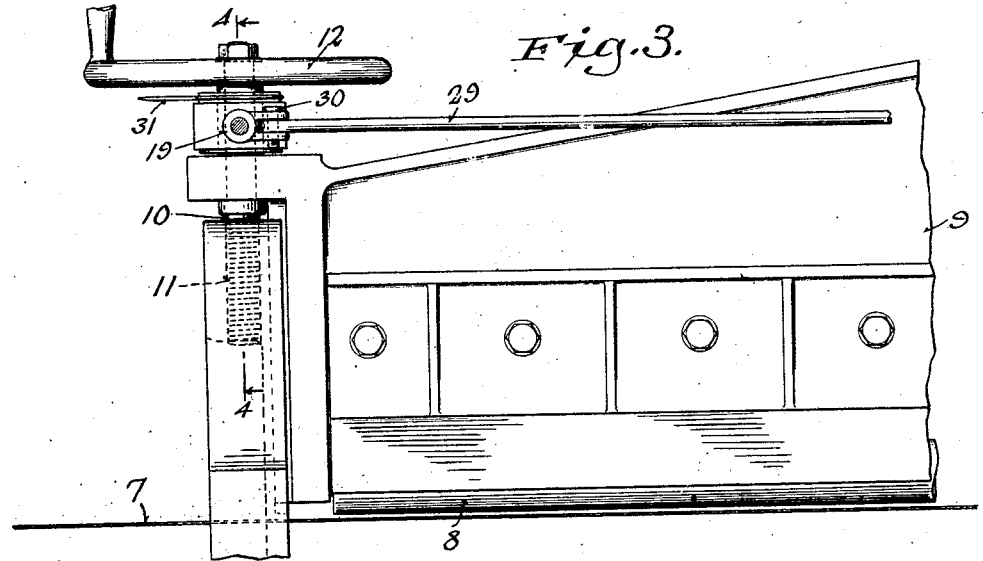
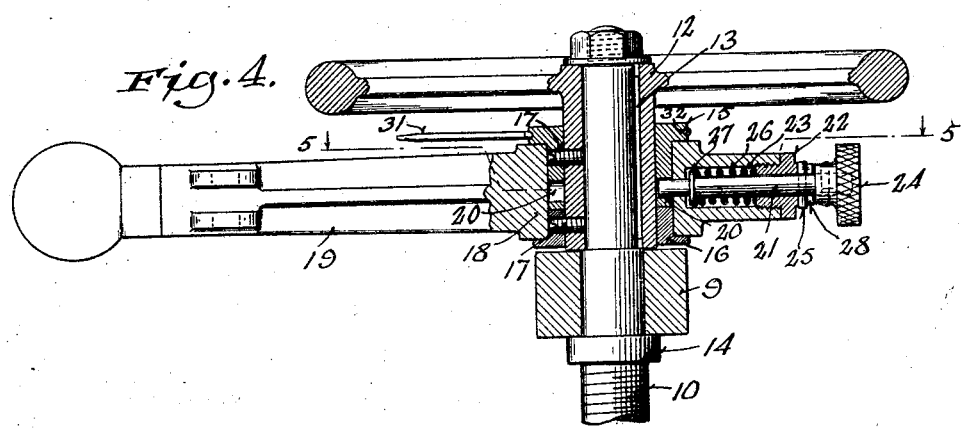
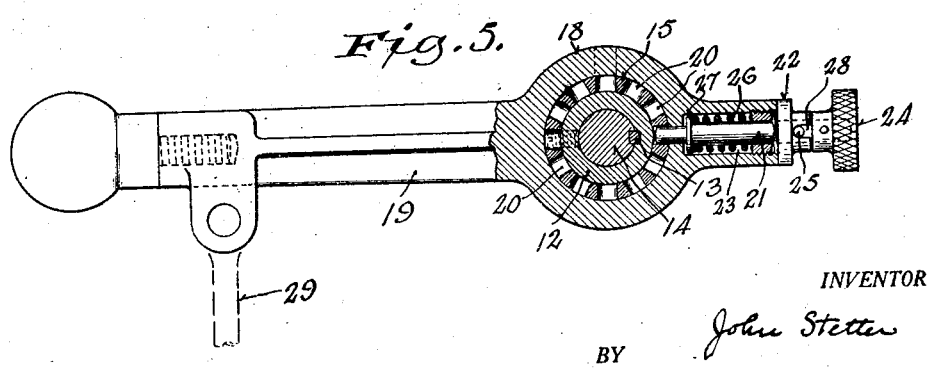
INVENTOR.
John Stetter
BY
Quarles & French
ATTORNEYS Patented Aug. 24, 1926.

1,597,117

UNITED STATES PATENT OFFICE.

JOHN STETTER, OF MILWAUKEE, WISCONSIN, ASSIGNOR TO PFISTER VOGEL LEATHER COMPANY, OF MILWAUKEE, WISCONSIN, A CORPORATION OF WISCONSIN.

LEATHER-SPLITTING MACHINE.

Application filed November 14, 1923. Serial No. 674,707.

The invention relates to leather splitting machines and more particularly to those of the belt knife type.

In leather splitting machines of the belt knife type the gauge roll is usually mounted on a gauge roll beam which is adjusted to vary the height of the gauge roll relative to the hide support by means of two independently adjustable hand-wheel-operated screw shafts at the ends of the beam. These machines are relatively long and with one operator much time is wasted in making adjustments. Furthermore, the adjustment of the gauge roll is of prime importance for upon it depends the thickness and uniformity of the split. The object of the present invention is to materially improve upon the usual adjustment of the gauge roll by the provision of means for simultaneously or independently operating the screw shafts at the ends of the beam.

The invention further consists in the several features hereinafter set forth and more particularly defined by claims at the conclusion hereof.

Figure 1:
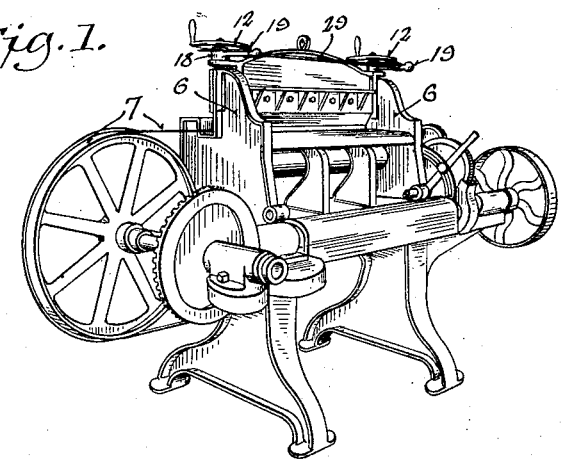
Figure 2:
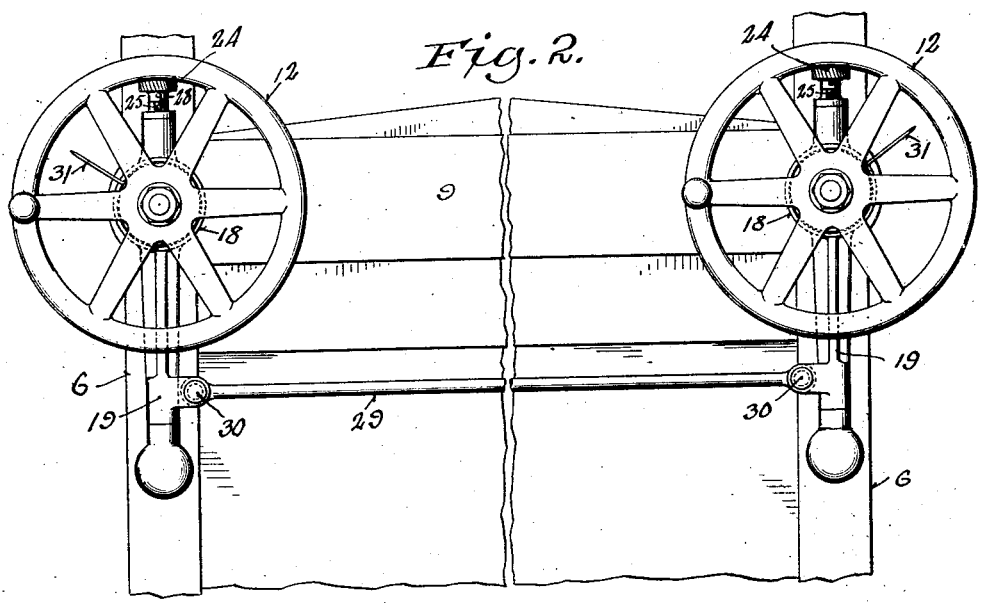

In the drawings: Fig. 1 is a perspective view of a leather splitting machine embodying the invention; Fig. 2 is a detail plan view of the machine showing the adjusting mechanism embodying the invention; Fig. 3 is a detail elevation view of one end of the gauge roll beam and its adjusting mechanism; Fig. 4 is a section taken on the line 4—4 of Fig. 3; Fig. 5 is a section taken on the line 5—5 of Fig. 4.

In the drawings the numeral 6 designates the frame of the machine, 7 the belt knife, 8 the gauge roll, 9 the gauge roll beam carrying the roll 8, and 10 the jack screw shafts operatively connected to the ends of the beam and mounted in threaded sockets or bores 11 in the end members of the frame for raising or lowering the beam 9.

Each jack or screw shaft 10 has a hand-wheel 12 secured thereto so as to turn therewith in any suitable manner, as by a key 13. Each end of the beam is mounted on the shaft 10 between the hand-wheel 12 and a flanged portion 14 of said shaft so that while the screw rotates in the ends of the beam the beam will be moved vertically by said shaft, it being understood that the connection between the shafts 10 and the beam is loose enough so that one end of the beam may be slightly higher than the other where the leather itself is of unequal thickness. A flanged collar, preferably made in two parts 15 and 16, has its parts secured to the hub of the hand-wheel 12 by set screws 17, and the hub 18 of an adjusting lever 19 is journaled on this collar and is secured against longitudinal movement by the flanges thereof. The part 15 of the collar is provided with a plurality of radially disposed apertures 20, any of which is adapted to be engaged by a pin 21. The pin 21 is slidably mounted in a cap 22 at the end of a bore 23 in the lever and carries a knurled handle 24 and a stop pin 25. The pin 21 is normally urged toward the collar by a spring 26 interposed between the cap 22 and a washer 27 fixed to the pin. Engagement of the pin 21 with one of the apertures 20 is permitted when the stop pin 25 alines with diametrically disposed notches 28 in the cap 22, and when said pin 21 is moved outwardly this is unlocked from the collar, and when rotated the pin 25 engages with the outer end of the cap and is thereby held in an inoperative position. The features described are the same for each jack shaft and it will be noted that the release of the pin 21 from the collar permits independent adjustment of each shaft by its hand-wheel, and that the pin forms a clutch connection between the lever and its screw shaft.

The levers 19 are operatively connected by a link 29 and pins 30, with the result that the swinging of one lever by the operator swings the other so that when the pins 21 on said levers are in engagement with the collar and hence operatively connected to the jack shaft 10, both of said shafts will be simultaneously turned to raise or lower the gauge beam and gauge roll, or when one of said pins 21 is disconnected the swinging of either lever will turn that shaft 10 which is connected to its lever by the other pin. Thus both ends of the beam may be simultaneously raised or lowered from either end of the machine and one end of the beam may be independently adjusted by the hand-wheel, if necessary. It will, therefore, be noted that a very accurate adjustment of the gauge roll is provided and hence uniformity of split of the hide by the revolving belt knife 7 with which the hide is brought into contact is assured.

As an aid to the operator an indicating pointer 31 may be secured to each collar, as by making said pointer of spring wire and forming a part thereof into a loop or ring seated in an annular groove 32 in the collar.

I desire it to be understood that this invention is not to be limited to any particular form or arrangement of parts except in so far as such limitations are included in the claims.

What I claim as my invention is:

1. An attachment for the gauge-roll-beam-adjusting shafts of a leather splitting machine comprising a member having a part directly connected to each shaft for independently turning said shaft, a second adjustable member for each shaft, a releasable clutch connection between said part of each first-named member and said second member, and means operatively connecting said second-named members together for simultaneous operation whereby both shafts may be adjusted simultaneously from either end of the machine and one of the shafts may be adjusted separately from either end of the machine.

2. In a leather splitting machine, the combination with the frame, the gauge roll beam and the gauge roll, of screw shafts carrying the beam and mounted in the frame for adjusting the position of the gauge roll, means for independently turning each of said shafts, a lever for each shaft, a clutch connection between each lever and its shaft, and means operatively connecting the levers together for simultaneous operation.

3. In a leather splitting machine, the combination with a frame, the gauge roll beam and the gauge roll, of screw shafts carrying the beam and mounted in the frame for adjusting the position of the gauge roll, means for independently turning each shaft, a lever for each shaft, a releasable pin clutch connection between each lever and its shaft, and means operatively connecting the levers for simultaneous operation.

4. In a leather splitting machine, the combination with a frame, the gauge roll beam and the gauge roll, of screw shafts carrying the beam and mounted in the frame for adjusting the gauge roll, means for independently turning each shaft, a lever for each shaft, a member operatively secured to each shaft and provided with radially disposed holes, a spring-pressed pin carried by each lever and engageable in any one of said holes, means for holding the pin in inoperative position, and a rod operatively connecting the levers together for simultaneous operation.

5. An attachment for the gauge-roll-beam-adjusting shafts of a leather splitting machine comprising a hand-wheel for each shaft having a hub portion fixed to its shaft, a clutch member for each shaft secured to turn therewith, a cooperative clutch member mounted to turn relative to its associated member and to turn therewith and thereon, and means connecting said cooperative clutch members for simultaneously operating said cooperative clutch members from either end of the machine.

6. An attachment for the gauge-roll-beam-adjusting shafts of a leather splitting machine comprising a hand-operated member directly connected to each shaft, a clutch member for each shaft secured to turn therewith and having flanged ends, a cooperative clutch member journalled on each of said first-named clutch members between said flanges and adapted to turn with said first-named clutch members and relative thereto, and means for simultaneously operating said cooperative clutch members from either end of the machine.

In testimony whereof, I affix my signature.

JOHN STETTER.